US008141578B2

(12) United States Patent
Zeyfang

(10) Patent No.: US 8,141,578 B2
(45) Date of Patent: *Mar. 27, 2012

(54) GAS BOTTLE VALVE STEM PROTECTIVE SLEEVE

(75) Inventor: Frederick W. Zeyfang, Erie, PA (US)

(73) Assignee: Protective Industries, Inc., Buffalo, NY (US)

( * ) Notice: Subject to any disclaimer, the term of this patent is extended or adjusted under 35 U.S.C. 154(b) by 607 days.

This patent is subject to a terminal disclaimer.

(21) Appl. No.: 11/996,729

(22) PCT Filed: Sep. 14, 2007

(86) PCT No.: PCT/US2007/078502

§ 371 (c)(1),
(2), (4) Date: Jan. 24, 2008

(87) PCT Pub. No.: WO2008/034065

PCT Pub. Date: Mar. 20, 2008

(65) Prior Publication Data

US 2010/0126596 A1 May 27, 2010

(51) Int. Cl.
*F16K 35/00* (2006.01)

(52) U.S. Cl. ........................................ 137/382; 220/724

(58) Field of Classification Search .................. 137/382, 137/383, 381; 215/250; 206/807; 138/92; 220/257.2, 258.2, 258.3, 270, 274, 214, 724; D23/233

See application file for complete search history.

(56) References Cited

U.S. PATENT DOCUMENTS

| | | | |
|---|---|---|---|
| 3,102,658 | A | 9/1963 | Rosen |
| 3,125,242 | A | 3/1964 | Davis |
| 3,587,654 | A | 6/1971 | Yocum |
| 3,684,124 | A | 8/1972 | Song |
| 4,095,713 | A | 6/1978 | Norton |
| 4,616,763 | A | 10/1986 | Ruhl |
| 4,630,638 | A | 12/1986 | Hafner et al. |
| 4,664,288 | A | 5/1987 | Pereira et al. |
| 4,712,705 | A | 12/1987 | Fuehrer |

(Continued)

FOREIGN PATENT DOCUMENTS

| | | |
|---|---|---|
| FR | 2 828 678 | 2/2003 |
| FR | 2 828 678 A | 2/2003 |
| GB | 2301348 | 12/1996 |
| WO | WO-97/29969 A | 8/1997 |

OTHER PUBLICATIONS

Gas Cylinder Valve Protective Sleeve marketed by Alliance Plastics 2000-2005.

(Continued)

*Primary Examiner* — Kevin Lee
*Assistant Examiner* — Macade Brown

(57) ABSTRACT

A protective sleeve for gas bottle valve stems is provided comprised of an elongated tubular body configured to fit on a valve stem. A projection extends from an interior surface of the protective sleeve and is adapted to lockingly engage with an orifice in an opposing surface of the valve stem whereby the sleeve is prevented from being easily removed from the valve stem upon being placed thereover due to engagement of the projection with the orifice. A tear strip is provided within a side surface of the protective sleeve, whereby a portion of the protective sleeve may be removed to permit disengagement of the protective sleeve. A housing may be provided in the protective sleeve for storage of a washer which may be used to provide a seal between a regulator and the valve stem of the gas bottle.

23 Claims, 7 Drawing Sheets

U.S. PATENT DOCUMENTS

| | | | | |
|---|---|---|---|---|
| 4,729,488 | A | 3/1988 | Bullock, III | |
| 5,144,972 | A | 9/1992 | Dryden | |
| 5,191,992 | A | 3/1993 | Darley | |
| 5,397,012 | A | 3/1995 | Tison et al. | |
| 5,544,770 | A | 8/1996 | Travisano | |
| 6,003,714 | A | 12/1999 | Buermann | |
| 6,286,702 | B1 | 9/2001 | Buermann | |
| 6,378,170 | B1 | 4/2002 | Foucault et al. | |
| D468,002 | S | 12/2002 | Steffan | |
| 6,854,616 | B2 * | 2/2005 | Steffan | 220/270 |
| D612,012 | S | 3/2010 | Buermann | |
| D612,013 | S | 3/2010 | Buermann | |
| 7,681,587 | B2 * | 3/2010 | Zeyfang | 220/724 |
| 2003/0127138 | A1 | 7/2003 | Zinelli | |
| 2003/0201266 | A1 | 10/2003 | Steffan | |

OTHER PUBLICATIONS

International Search Report issued in WO 2008/034065.

Written Opinion issued in WO 2008/034065.

Moss Gas Cylinder Valve Protector (est. 1990) www.mossplastics.com/gas-cylinder-valve-protectors.

Ratermann Manufacturing Company Medical Dust Cover Advertisement approx. Dec. 2007.

Ratermann Manufacturing Company on-line product catalog p. 8A-3 Medical Dust Cover with and without washer holder Sep. 2011.

Ratermann manufacturing Company website Medical Dust cover with and without washer holder Sep. 2011.

* cited by examiner

GAS BOTTLE VALVE STEM PROTECTIVE SLEEVE

CROSS-REFERENCE TO RELATED APPLICATIONS

This application is a 35 USC 371 application of PCT/US07/78502, filed Sep. 14, 2007, which claims priority of U.S. application Ser. No. 11/522,542, filed Sep. 15, 2006.

BACKGROUND OF THE PRESENT INVENTION

The present invention is directed to a sleeve for use in connection with gas bottle post valves.

Gas bottles have a variety of end uses. Such end uses range from various industrial applications, where a specified gas is required (ranging from inert gases, such as nitrogen, to oxygen gas), to medical uses where oxygen is to be administered to a patient in need of oxygen. Such bottles have a tubular valve stem extending from an end of the gas bottle for engagement with a gas delivery tube or pipe.

To insure the purity of the bottle content, it is important that a dust cover (or protective cover) be employed to cover the orifice in order to prevent the entry of dust and/or debris therein. It is also important that the dust cover be easy to install, while being retained on the bottle post valve stem during shipment, storage, and handling. It is further important that the dust cover be easy to remove.

Additionally, it is often uncertain if a gas bottle has been used, such that the bottle may be either full or empty. Such uncertainty would be a significant disadvantage in the instance where, for example, the bottle is an oxygen source for a person in need of administration of oxygen.

Conventional devices to seal gas valves suffer many disadvantages, such as being difficult to install or to remove; require threading of small parts; require pre-soaking, drying time or heat guns; result in poor fit; are vulnerable to tampering; may become brittle when exposed to heat or cold; etc.

A need accordingly exists for a method by which a gas bottle may be modified to clarify whether gas has been delivered by the bottle, or whether the bottle is unused, and which does not suffer from any of the disadvantages suffered by conventional devices.

Washers/seals are also used on medical gas oxygen regulators to ensure that the seal between the oxygen bottle and the regulator is tight. A tight seal reduces the possibility of oxygen leaking from the bottle during use, thus avoiding a safety hazard from occurring. While a variety of washers/seals are available for use with such regulators, the users of such oxygen bottles have a tendency to reuse the washers/seals. Repeated reuse has been found to diminish the ability of the washer/seal to provide a tight seal, thus resulting in oxygen gas leakage. A safety hazard thus exists.

A need accordingly exists to provide means to facilitate the use by the end user of fresh washers/seals during use of the oxygen bottle.

OBJECTS AND SUMMARY OF THE INVENTION

It is accordingly an object of the present invention to provide a protective sleeve for use with gas bottle post valve stems.

It is further an object of the present invention to provide a protective sleeve that will serve to seal an orifice in a post valve stem of a gas bottle.

It is further an object of the present invention to provide a protective sleeve that can be easily placed in locking engagement with a post valve stem of a gas bottle.

It is further an object of the present invention to provide a protective sleeve that may be easily engaged and easy to remove, while remaining in secure protective engagement with the valve stem during use.

It is still further an object of the present invention to provide a protective sleeve that includes a washer housing, which includes means for mounting a washer within the housing.

Accordingly, there is thus provided a protective sleeve for use in connection with valve stems for gas bottles, with the protective sleeve comprised of an elongated tubular body of such length as to extend along at least a portion of the length of said valve stem, an outwardly extending projection extending from an interior surface of said protective sleeve and adapted to physically engage with an orifice in an opposing surface of said valve stem in locking engagement therewith whereby said protective sleeve is prevented from being easily removed from said valve stem upon being placed thereover due to engagement of said projection with said orifice; and a tear strip provided within at least a portion of a side surface of the protective sleeve, whereby at least a portion of the side surface of the protective sleeve may be removed by tearing the tear strip so as to permit disengagement and removal of the protective sleeve from the valve stem. The protective sleeve optionally may include a washer housing formed as an integral portion of a sidewall of the elongated body, with the washer housing including means to mount a washer within the housing.

DETAILED DESCRIPTION OF THE INVENTION

Figure 1:
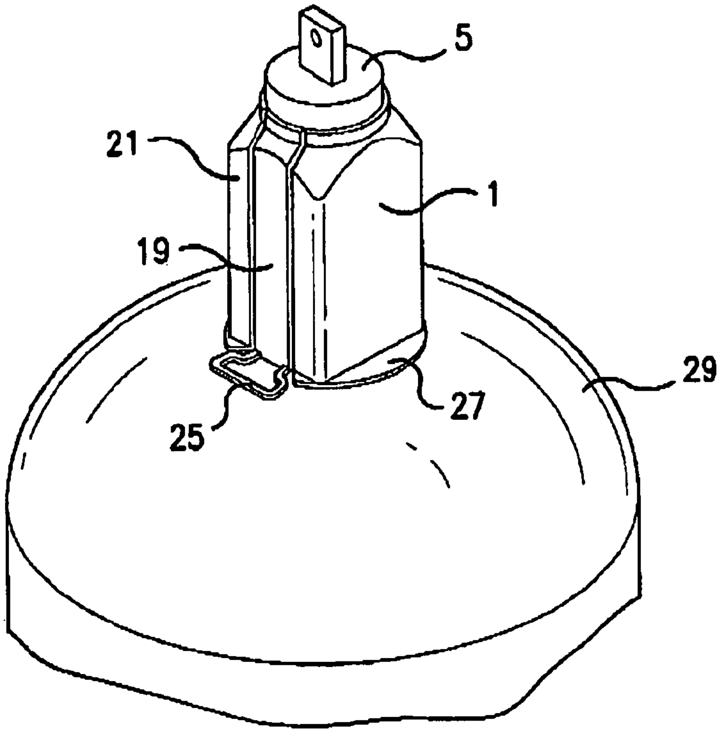
FIG. 1 is a view of the protective sleeve of the present invention installed in protective position over a gas valve of a gas bottle.

The invention will be described in connection with the FIGS. 1-18.

As shown in FIGS. 1-4, the present invention comprises a protective sleeve 1 for use in connection with valve stems for gas bottles 29. The protective sleeve 1 is comprised of an elongated body 3 of such length as to extend along at least a portion of the length of the valve stem 5.

The cross-sectional dimension of the protective sleeve should be such that the sleeve snugly engages the valve stem to enhance the protective aspect of the sleeve, and particularly to enhance the engagement of the protective sleeve with the valve stem in the manner discussed below.

The protective sleeve includes a locking mechanism to inhibit or prevent removal of the protective sleeve from the valve stem when placed thereover. The locking mechanism may, for example, comprise a ratchet-type projection 7 extending outwardly from an interior surface 9 of the protective sleeve which is adapted to physically engage with an orifice 11 in an opposing surface 13 of the valve stem. When so engaged, the protective sleeve is prevented from being removed from the valve stem upon being placed thereover due to engagement of said projection 7 with the orifice 11. The outwardly extending projection may be of any suitable cross-sectional configuration.

However, while the cross-sectional configuration of the outwardly extending projection is not critical, the cross-sectional configuration is preferably configured to fit snugly within the orifice in the valve stem. Multiple outwardly extending projections 7' (FIG. 3) may be provided to the extent that additional locking with a corresponding orifice is provided and/or believed necessary.

Figure 2A:
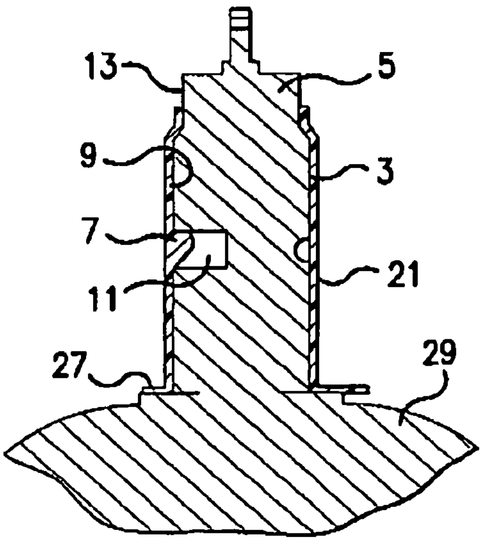
FIG. 2A is a cross-sectional view of the protective sleeve of FIG. 1.
Figure 2B:
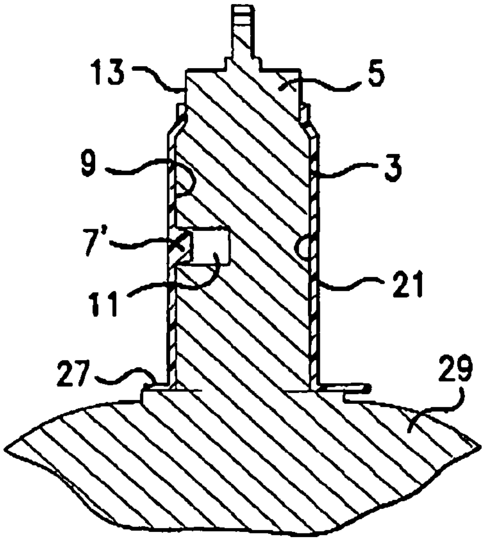
FIG. 2B is a cross-sectional view of another embodiment of the protective sleeve of FIG. 1.

The protective sleeve is preferably open-ended at each end. As shown in FIGS. 2A and 2B, the sleeve has an open end 15 adjacent the gas bottle, and an open end 17 through which the end of the valve stem extends.

In order to assist in the locking of the outwardly extending projection in the orifice, the outwardly extending projection is shown in FIG. 2A as having a shoulder at one end thereof and ramp at the other end thereof. The shoulder serves to lock against an interior surface of an orifice, while the ramp serves to facilitate placing the sleeve in locking engagement with the valve stem. Alternatively, as shown in FIG. 2B, each end of the projection may include a shoulder to lock against adjacent sides of the orifice. In each instance, the dimension of the projection is preferably sized to fit snugly within the orifice.

The protective sleeve also includes a tear strip 19 positioned along a side 21 of the protective sleeve. A portion of the protective sleeve may thus be removed by tearing so as to permit disengagement and removal of the protective sleeve from the valve stem.

Figure 3:
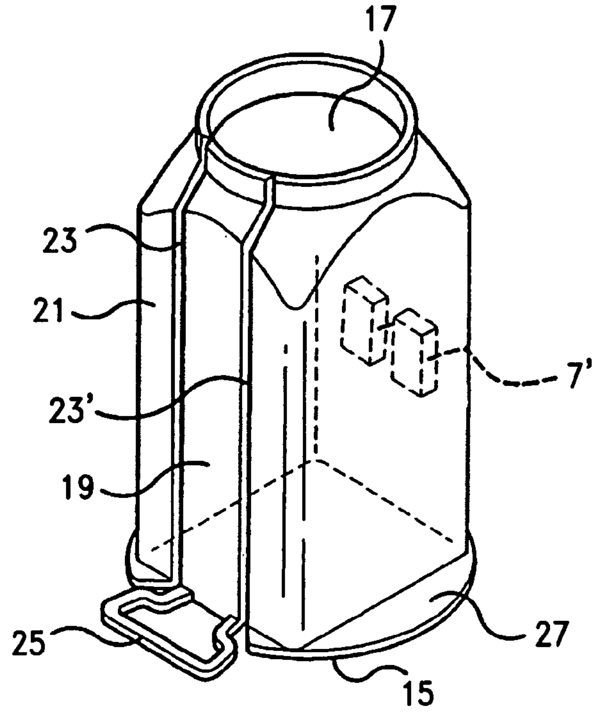
FIG. 3 is a view of one embodiment of the protective sleeve of the present invention.
Figure 4:
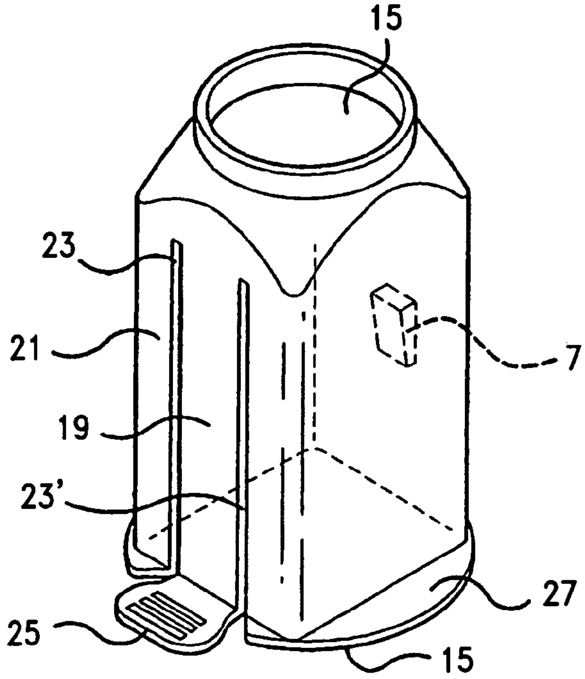
FIG. 4 is a view of another embodiment of the protective sleeve of the present invention.

The tear strip extends longitudinally along at least a portion of a side 21 of the protective sleeve, and is defined laterally by parallel tear lines 23, 23' formed in a side of the protective sleeve. The tear lines preferably extend along the entire longitudinal extent of the protective sleeve as shown in FIG. 3, but are not required to do so as shown in FIG. 4. The tear lines need only extend along a portion of a side of the protective sleeve to an extent sufficient to permit disengagement of the sleeve from the valve stern.

In order to enhance the ease by which the tear strip may be torn and removed, a grip member 25 is preferably provided which is attached to a portion of the tear strip to facilitate tearing of the tear strip. The configuration of the grip member is not critical, and different configurations may be used as shown in FIGS. 3 and 4.

The protective sleeve may further include support flange members extending laterally outwardly from the bottom of said protective sleeve. The flange members 27 assist in providing support for the base of the protective sleeve on top of the gas bottle 29 upon engagement with the valve stem if the gas bottle has an upper surface which may provide suitable support for such flanges, and if the protective sleeve is of such dimension to extend to the top of the gas bottle.

Figure 5:
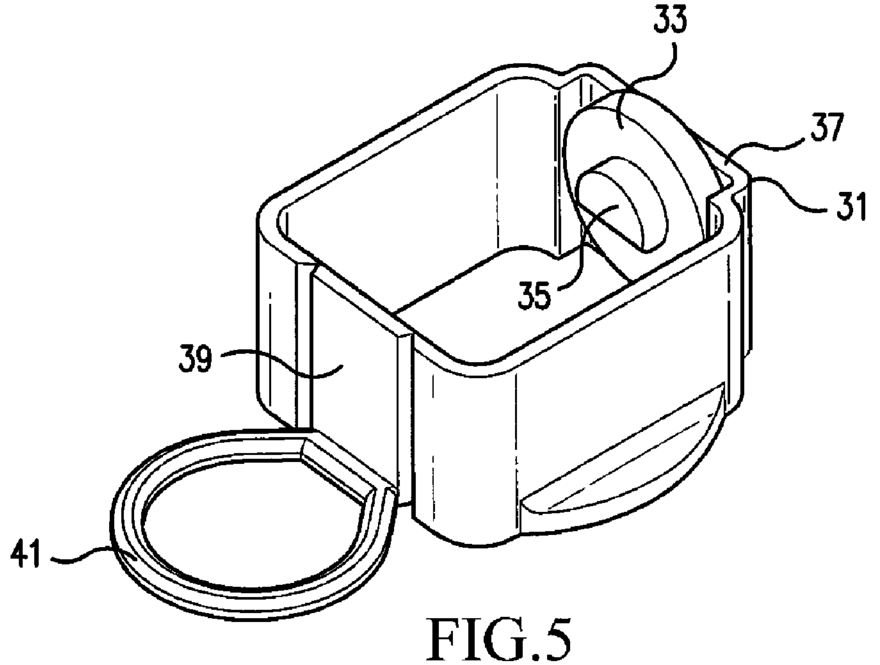
FIG. 5 is a view in perspective of the interior of the protective sleeve of the present invention which depicts the washer housing and a washer mounted therein.

FIG. 5 depicts the interior of a typical protective sleeve (with only the bottom portion of the protective sleeve shown in the drawing to permit better viewing of the interior of the sleeve) having a housing 31 for storage of a washer 33 which may be used by the user of a gas bottle. The housing is integrally molded into one of the walls of the protective sleeve, with the walls of the housing extending a short distance outwardly from the protective sleeve a distance sufficient to account for the thickness of the washer 33. The central hole of the washer is engaged with a protrusion 35 extending inwardly from a wall 37 of the housing to permit storage of the washer within the housing. While the protrusion 35 also serves to lockingly engage an orifice in the valve stem upon placement of the protective sleeve onto the valve stem, it is not required to do so. For instance, the washer housing may include a protrusion whose sole function is to engage the washer, with the protective sleeve including another protrusion which serves to lockingly engage an orifice in the valve stem.

Once the at least one tear strip 39 of the protective housing is removed by application of force to ring tab 41, and the protective sleeve removed from the gas bottle, the user is able to access the washer 33 and use it when attaching the regulator to the valve of the gas bottle. Such an arrangement thus encourages the user to always use a fresh washer when engaging the regulator and the gas bottle, as the washer is always easily at hand.

Figure 6:
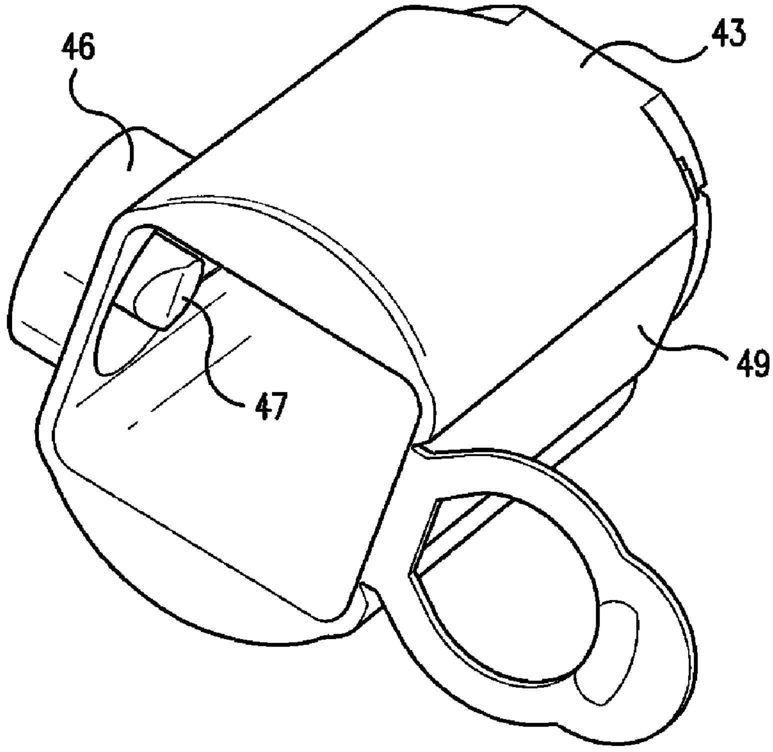
FIG. 6 is a view in perspective of the interior of the protective sleeve of the present invention which depicts another embodiment of the washing housing.
Figure 7:
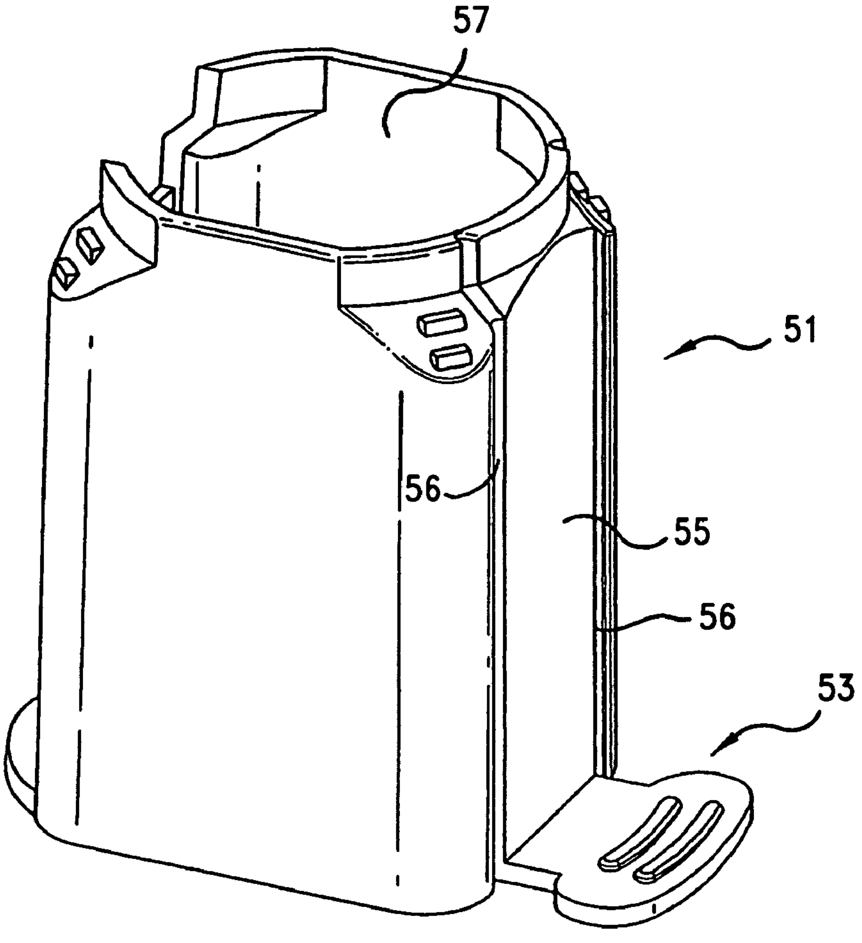
FIG. 7 is a view in perspective of another embodiment of the protective sleeve of the present invention.
Figure 8:
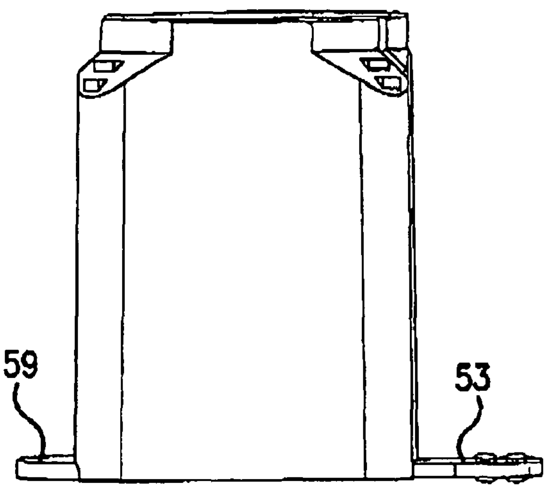
FIG. 8 is a side view of the embodiment of the protective sleeve of FIG. 7.
Figure 9:
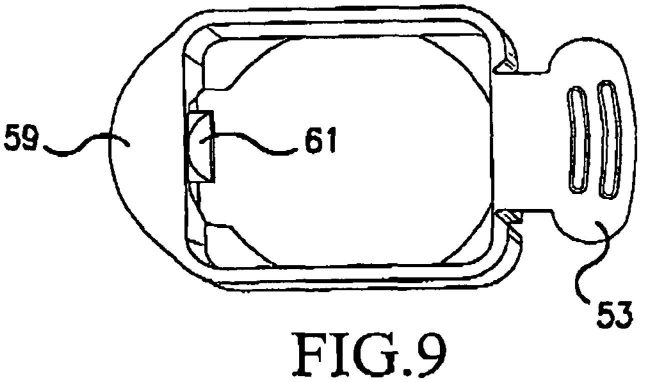
FIG. 9 is a bottom view of the embodiment of the protective sleeve of FIG. 7.
Figure 10:
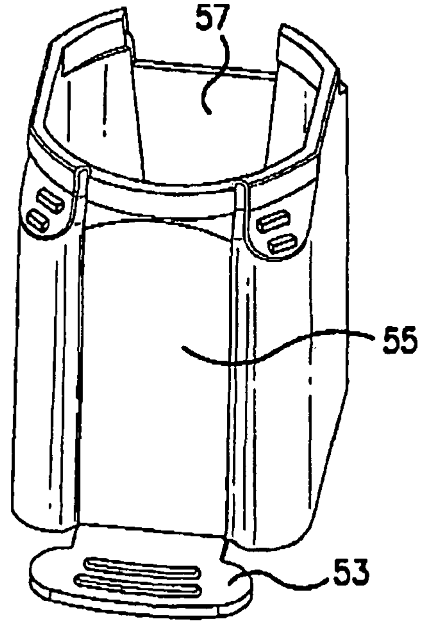
FIG. 10 is another view in perspective of the protective sleeve of FIG. 7.

FIG. 6 depicts another embodiment of the washer housing for use with the protective sleeve of the present invention. The Figure depicts a view from the bottom of a protective sleeve 43 according to the present invention having a housing 46 for storage of a washer (not shown) which may be used by the user of a gas bottle. The housing 46 is integrally molded into the walls of the protective sleeve 43, with the walls of the housing extending a short distance outwardly from the protective sleeve a distance sufficient to account for the thickness of the washer. The central hole of the washer is engaged with a protrusion 47 extending inwardly from an innermost surface of the housing 46 to permit storage of the washer within the housing. The protrusion 47 also serves to lockingly engage an orifice in the valve stem of the gas bottle upon placement of the protective sleeve upon the valve stem.

Once the at least one tear strip 49 of the protective housing is removed, and the protective sleeve removed from the gas bottle, the user is able to access the washer and remove the washer from engagement with protrusion 47 and use it when attaching the regulator to the valve of the gas bottle. Such an arrangement thus encourages the user to always use a fresh washer when engaging the regulator and the gas bottle, as the washer is always easily at hand.

FIGS. 7-10 depict yet another embodiment of the present invention. The protective sleeve 51 of FIGS. 7-10 has a pull tab 53 attached to the bottom of tear strip 55 in one of the sides of the protective sleeve defined by tear lines 56. Side tab 59 extends from the bottom of the sleeve body opposite from the pull tab 53. In use, the protective sleeve 51 is placed over the gas bottle valve stem, with the valve stem extending from the top 57 of the protective sleeve. Protrusion 61 lockingly engages with an orifice in the gas bottle valve stem to lock the protective sleeve in place on the valve stem.

FIGS. 11-18 depict alternate embodiments of the protective sleeve of the present invention having different types of washer housings.

Figure 11:
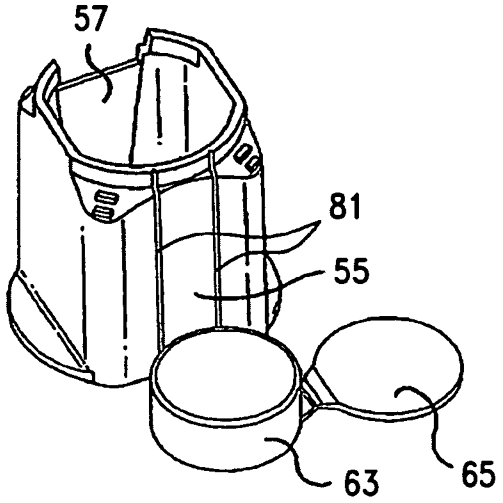
FIGS. 11-18 are additional embodiments of the protective sleeve of the present invention having different washer storage housings.
Figure 12:
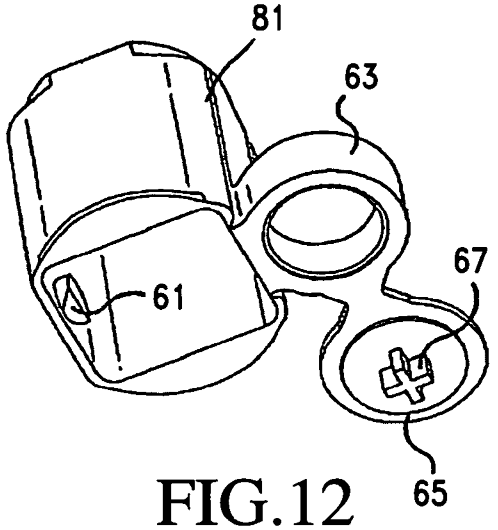

FIGS. 11 and 12 depict a protective sleeve having a top portion 57, and washer housing 63 attached to one bottom side portion of the protective sleeve. The washer housing includes a base portion 63 and a hinged top of the base 65 containing a hub 67 upon which the washer (not shown) is placed for storage. The washer housing as shown is attached to tear strip 55 on the side of the protective sleeve housing, and can be used as a grip member to tear the tear strip along tear lines 81.

Figure 13:
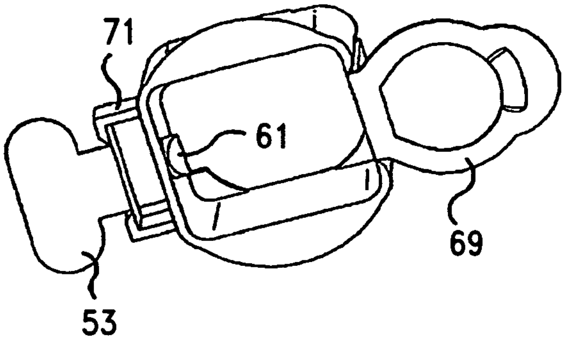
Figure 14:
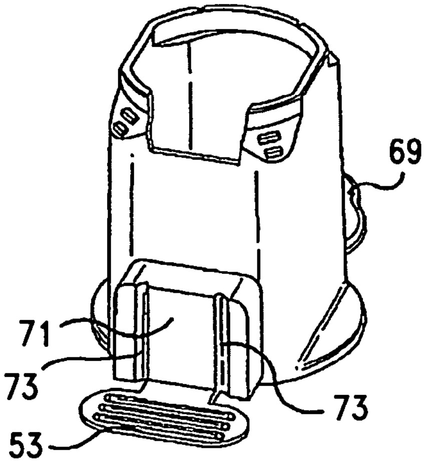

FIGS. 13 and 14 depict a protective sleeve having bottom tabs 53 and 69, and housing 71 for storage of a washer. The housing 71 includes tear strip 73 which, upon being removed, exposes the washer placed inside. The interior of the sleeve includes protrusion 61.

Figure 15:
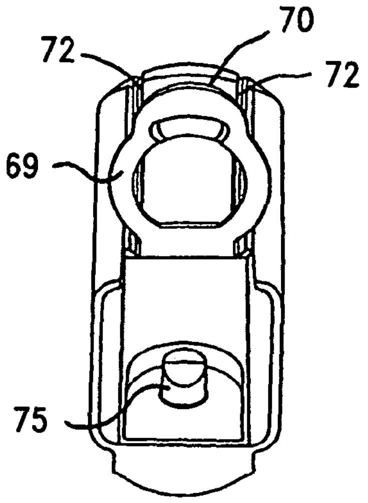
Figure 16:
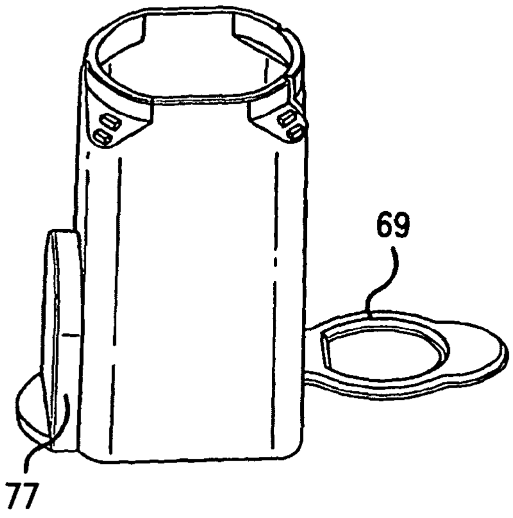

FIGS. 15 and 16 depict a protective sleeve having a protrusion 75 upon which the washer may be placed within housing 77, and ring tab 69 attached to tear strips strip 70 defined by tear lines 72 as previously discussed.

Figure 17:
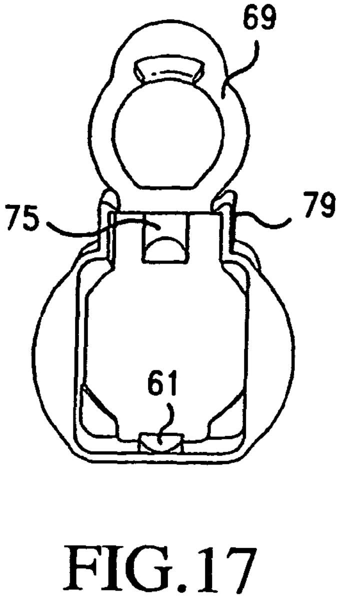
Figure 18:
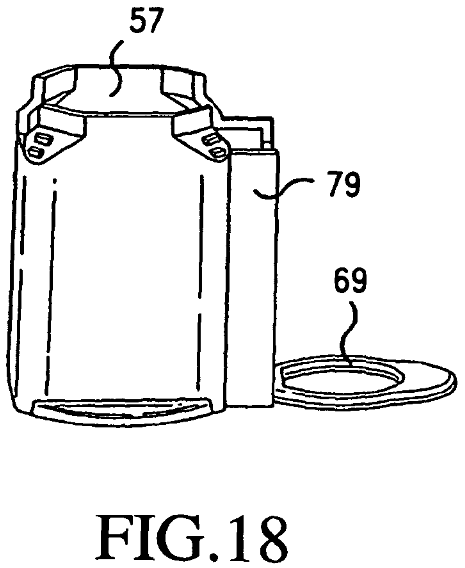

FIGS. 17 and 18 depict a protective sleeve having a top portion 57, protrusion 61 adapted to engage an orifice in the valve stem, and protrusion 75 adapted to store a washer thereon within housing 79. Ring tab 69 is attached to a tear strip (no shown) on the side of the housing 79. Upon removal of the tear strip, the washer may be removed and the protective sleeve removed from engagement with the valve stem.

The protective sleeve may be formed of any suitable material which enables the protective sleeve to function in the manner discussed above. The protective sleeve is preferably comprised of a plastic resin material, and once formed, is sufficiently flexible to be placed over the valve stem and into engagement therewith, and sufficiently inflexible to remain engaged therewith absent removal of the tear strip. The protective sleeve may be comprised of a variety of plastic resin materials, such as low density polyethylene or filled flexible polyvinyl chloride. The selection of such materials and the molding method by which the sleeve may be formed are well known to those of ordinary skill in the art.

What is claimed is:

1. A protective sleeve for use in connection with valve stems for gas bottles, said protective sleeve comprised of an elongated four-sided unitary molded tubular body having opposing open ends, said body being of such length as to extend along at least a portion of the length of said valve stem, said sides of said unitary body configured to conform to adjacent faces of said valve stem in protective relationship thereto when said protective sleeve is placed over said valve stem, one or more projections extending from an interior surface of said protective sleeve and adapted to physically engage with an orifice in an opposing surface of said valve stem and in locking engagement therewith, whereby said protective sleeve is prevented from being easily removed from said valve stem upon being placed over an end of said valve stem and moved into sliding locking engagement with said orifice of said valve stem due to engagement of said projection with said orifice; and a tear strip provided within at least a portion of a side surface of said protective sleeve, whereby at least a portion of said side surface of said protective sleeve may be removed by tearing said tear strip so as to permit disengagement and removal of said protective sleeve from said valve stem, said sleeve further including at least one flange extending laterally outwardly from said sleeve along a plane transverse to a longitudinal axis of said unitary molded tubular body, and further including a housing for storage of a washer, said housing extending laterally outwardly along a plane transverse to a longitudinal axis of said unitary molded tubular body.

2. The protective sleeve of claim 1, wherein said tear strip extends longitudinally along at least a portion of a side of said protective sleeve, and is defined laterally by parallel tear lines formed in said side of said protective sleeve.

3. The protective sleeve of claim 1, comprised of a plastic resin material.

4. The protective sleeve of claim 1, further including multiple flange members extending laterally outwardly from the bottom of said protective sleeve.

5. The protective sleeve of claim 1, wherein said housing for storage of said washer has a portion adapted to physically engage with an interior hole of said washer to hold said washer in place within said housing.

6. The protective sleeve of claim 1, wherein said housing for storage of said washer includes a removable cover to close said washer within said housing.

7. The protective sleeve of claim 1, wherein said housing is attached to a portion of said tear strip and serves as a grip member to facilitate tearing of said tear strip.

8. The protective sleeve of claim 7, wherein said tear strip extends longitudinally along at least a portion of a side of said protective sleeve, and is defined laterally by parallel tear lines formed in said side of said protective sleeve.

9. The protective sleeve of claim 7, comprised of a plastic resin material.

10. The protective sleeve of claim 7, wherein said housing for storage of said washer has a portion adapted to physically engage with an interior hole of said washer to hold said washer in place within said housing.

11. The protective sleeve of claim 7, wherein said housing for storage of said washer includes a removable cover to close said washer within said housing.

12. The protective sleeve of claim 1, wherein said at least one flange extends laterally outwardly from the bottom of said sleeve.

13. A protective sleeve for use in connection with valve stems for gas bottles, said protective sleeve comprised of an elongated four-sided unitary molded tubular body having opposing open ends, said body being of such length as to extend along at least a portion of the length of said valve stem, said sides of said unitary body configured to conform to adjacent faces of said valve stem in protective relationship thereto when said protective sleeve is placed over said valve stem, one or more projections extending from an interior surface of said protective sleeve and each adapted to physically engage with an orifice in an opposing surface of said valve stem and in locking engagement therewith, whereby said protective sleeve is prevented from being easily removed from said valve stem upon being placed over an end of said valve stem and moved into sliding locking engagement with said orifices of said valve stem due to engagement of said projections with said orifices; and a tear strip provided within at least a portion of a side surface of said protective sleeve, whereby at least a portion of said side surface of said protective sleeve may be removed by tearing said tear strip so as to permit disengagement and removal of said protective sleeve from said valve stem, said sleeve further including opposing disconnected flanges extending laterally outwardly from said sleeve along a plane transverse to a longitudinal axis of said unitary molded tubular body, and further including a housing for storage of a washer, said housing extending laterally outwardly along a plane transverse to a longitudinal axis of said unitary molded tubular.

14. The protective sleeve of claim 13, wherein said tear strip extends longitudinally along at least a portion of a side of said protective sleeve, and is defined laterally by parallel tear lines formed in said side of said protective sleeve.

15. The protective sleeve of claim 13, comprised of a plastic resin material.

16. The protective sleeve of claim 13, wherein said housing for storage of said washer has a portion adapted to physically engage with an interior hole of said washer to hold said washer in place within said housing.

17. The protective sleeve of claim 13, wherein said housing for storage of said washer includes a removable cover to close said washer within said housing.

18. The protective sleeve of claim 13, wherein said housing is attached to a portion of said tear strip and serves as a grip member to facilitate tearing of said tear strip.

19. The protective sleeve of claim 18, wherein said tear strip extends longitudinally along at least a portion of a side of said protective sleeve, and is defined laterally by parallel tear lines formed in said side of said protective sleeve.

20. The protective sleeve of claim 18, comprised of a plastic resin material.

21. The protective sleeve of claim 18, wherein said housing for storage of said washer has a portion adapted to physically engage with an interior hole of said washer to hold said washer in place within said housing.

22. The protective sleeve of claim 18, wherein said housing for storage of said washer includes a removable cover to close said washer within said housing.

23. The protective sleeve of claim 13, wherein said flanges extend laterally outwardly from the bottom of said sleeve.

* * * * *